(12) United States Patent
Hayman

(10) Patent No.: US 11,976,956 B2
(45) Date of Patent: May 7, 2024

(54) DEVICE AND METHOD FOR MEASURING LIQUID LEVEL IN A CONTAINER BY A PROTECTED PRESSURE SENSOR

(71) Applicant: ERM ELECTRONIC SYSTEMS LTD., Rishon Lezion (IL)

(72) Inventor: Meir Hayman, Rishon Lezion (IL)

(73) Assignee: ERM ELECTRONIC SYSTEMS LTD., Rishon Lezion (IL)

( * ) Notice: Subject to any disclaimer, the term of this patent is extended or adjusted under 35 U.S.C. 154(b) by 99 days.

(21) Appl. No.: 17/960,077

(22) Filed: Oct. 4, 2022

(65) Prior Publication Data
US 2023/0045889 A1    Feb. 16, 2023

Related U.S. Application Data

(63) Continuation-in-part of application No. PCT/IL2021/050373, filed on Apr. 5, 2021.

(30) Foreign Application Priority Data

Apr. 6, 2020  (IL) ........................................ 273837

(51) Int. Cl.
*G01F 23/00*    (2022.01)
*G01F 23/16*    (2006.01)

(52) U.S. Cl.
CPC .......... *G01F 23/164* (2013.01); *G01F 23/168* (2013.01)

(58) Field of Classification Search
CPC ....... G01F 23/164; G01F 23/168; G01F 23/00
See application file for complete search history.

(56) References Cited

U.S. PATENT DOCUMENTS 4,631,374 A     12/1986   Zoludow
4,869,104 A  *   9/1989   Saito ..................... G01F 23/162
                                                              165/47

(Continued)

FOREIGN PATENT DOCUMENTS

CN       101720428 A      6/2010
CN       110375823 A     10/2019

(Continued)

OTHER PUBLICATIONS

Search Report for Israeli Application No. 273837 dated Jun. 15, 2020, 2 pp.

*Primary Examiner* — Jamel E Williams
(74) *Attorney, Agent, or Firm* — The Roy Gross Law Firm, LLC; Roy Gross

(57) ABSTRACT

Disclosed herein are a device and method designed for determining the liquid level in a container through measuring the pressure in the liquid by a pressure sensor located at the bottom of the container within a chamber designed to prevent solid particles dispersed in the liquid from reaching the sensor. Measuring the pressure of the liquid in the container can be based on an upper chamber located above a lower chamber, both adjacent chambers are located within a container. The upper chamber comprises tiny slots allowing the liquid in the container to enter the upper chamber and exert a weight on a diaphragm gasket functioning as a common-wall of the two adjacent chambers. The diaphragm gasket exerts pressure resulting from the liquid weight, on the lower chamber containing the pressure sensor designed to measure the pressure exerted on the lower chamber. In some embodiments, the device and method disclosed herein are used for measuring changes in the pressure at the bottom of the container, wherein the pressure changes are indicative of changes in the liquid level. In some embodiments, the (Continued)

measured pressure can be one or more pressure values measured in a continuously fashion by a one or more pressure sensors.

20 Claims, 12 Drawing Sheets

(56) References Cited

U.S. PATENT DOCUMENTS

| | | |
|---|---|---|
| 5,531,111 A | 7/1996 | Okamoto et al. |
| 6,606,905 B2 | 8/2003 | Carroll et al. |
| 6,666,085 B1 | 12/2003 | Lowe |
| 2006/0033630 A1 | 2/2006 | Lyall |
| 2009/0165477 A1 | 7/2009 | Sturken et al. |
| 2010/0126265 A1 | 5/2010 | Nakamura |
| 2019/0186975 A1 | 6/2019 | Pennebaker, III |

FOREIGN PATENT DOCUMENTS

| | | |
|---|---|---|
| CN | 210375302 U | 4/2020 |
| DE | 3728042 A1 | 3/1989 |
| DE | 19953216 C1 | 1/2001 |
| GB | 704248 A | 2/1954 |
| JP | S62119414 A | 5/1987 |
| JP | 5899576 B2 | 4/2016 |
| WO | 2021205432 A1 | 10/2021 |

\* cited by examiner

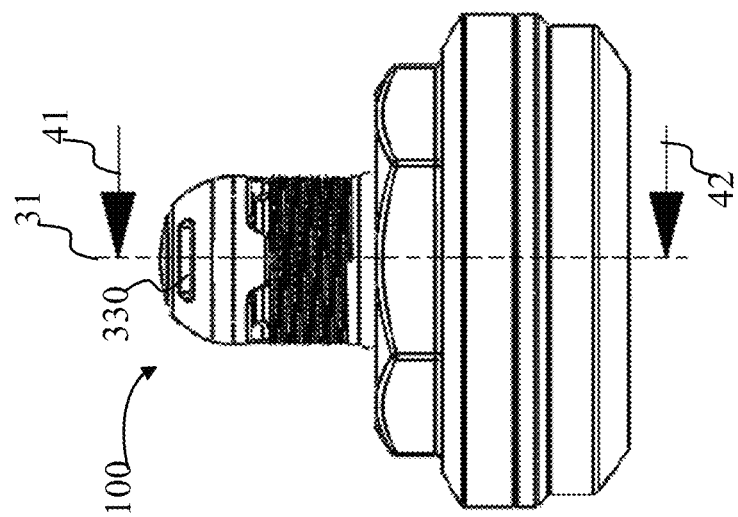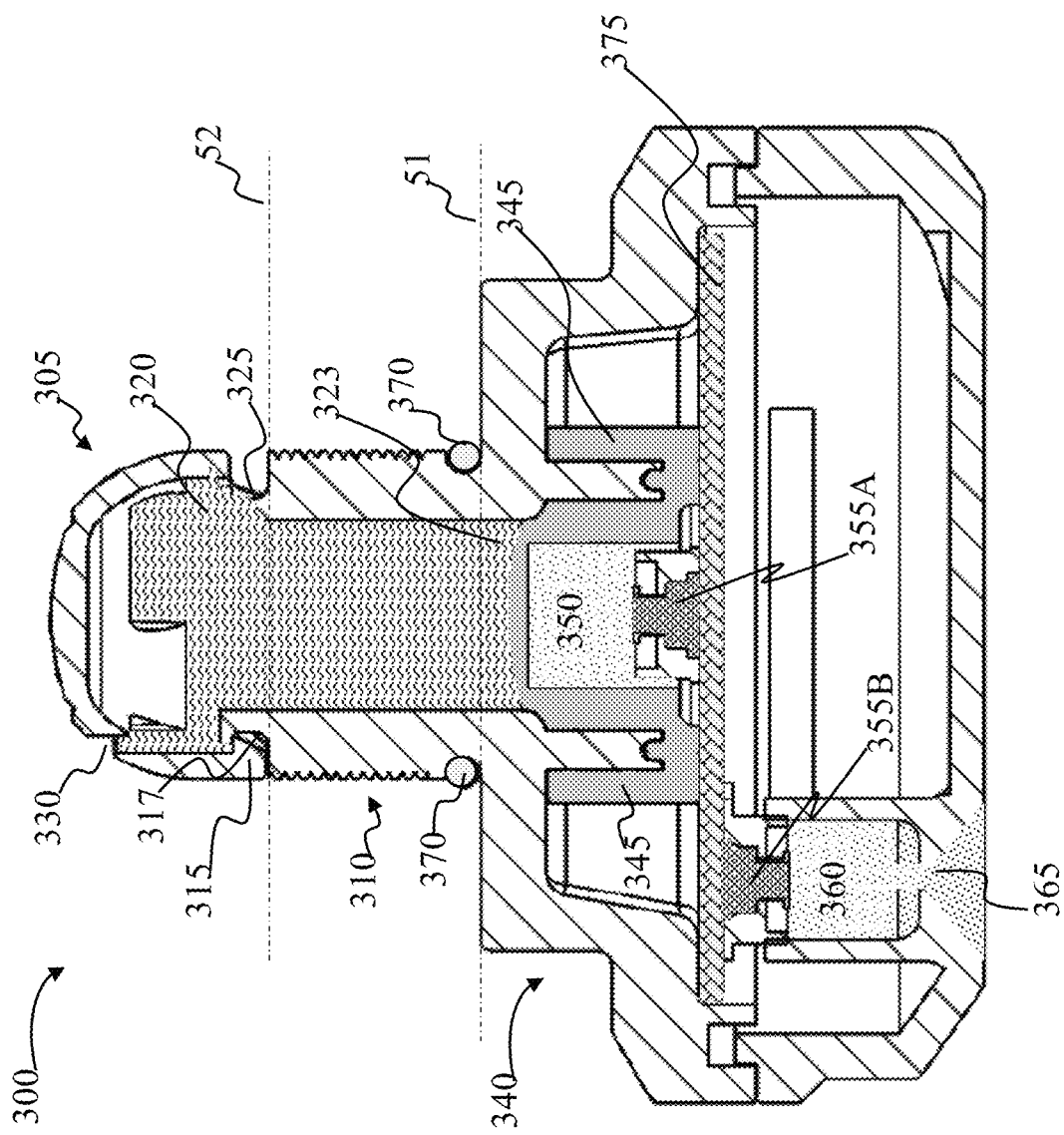
Fig. 3A

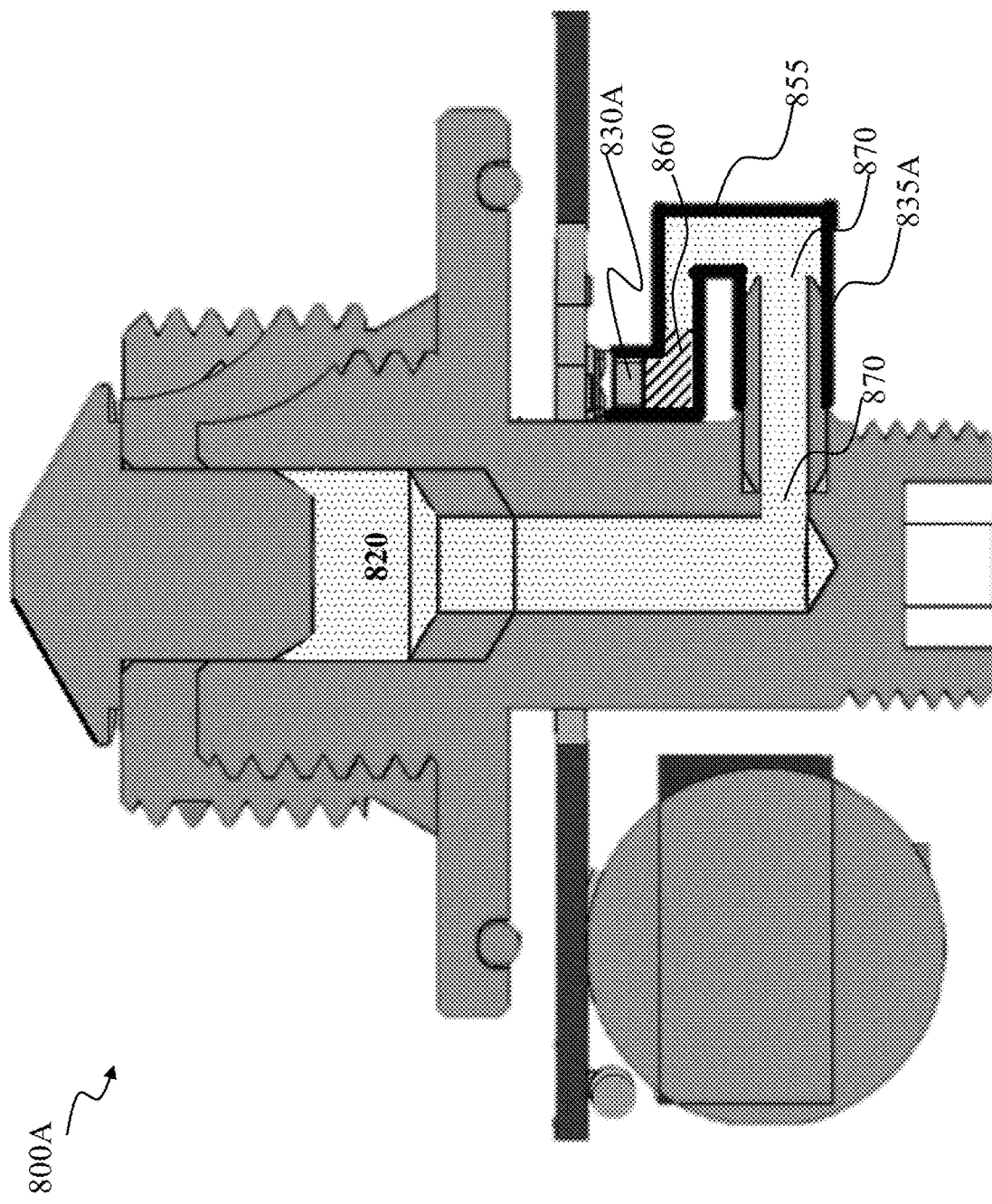

DEVICE AND METHOD FOR MEASURING LIQUID LEVEL IN A CONTAINER BY A PROTECTED PRESSURE SENSOR

CROSS REFERENCE TO RELATED APPLICATIONS

This application is a Continuation in Part of PCT Patent Application No. PCT/IL2021/050373 having International filing date of Apr. 5, 2021, which claims the benefit of priority of Israeli Patent Application No. 273837, filed Apr. 6, 2020, the contents of which are all incorporated herein by reference in their entirety.

The invention relates generally to the field of pressure sensing, and more particularly to determining the level of a liquid held in a container with the use of pressure sensors.

BACKGROUND

Diverse method, tools and systems are designed for measuring the liquid level within a container. While a sight glass can be considered as a rather reliable method, it requires an on-premises person. Indicating the liquid level or the fluid level remotely and in automated fashion may always involve some technical, mechanical components, and transmission means.

One of the challenges of existing solutions designed for measuring and/or calculating the liquid level may be with the liquids themselves, which in multiple cases can comprise solid particles such as metal particles, clumped flocs, loosely fine particles suspended in the liquid and other dirt parts. In multiple cases the solid parts in the liquid can interfere the operation of the solutions residing within the container which held the liquid. Furthermore, in multiple cases, the solid particles in the liquid can also expedite wear processes of the mechanical parts of the existing solution. In multiple cases, existing solutions comprise electronic and mechanical parts such as, pressure sensor, electronic components designed to receive the signal from the pressure sensor, electronic components for calculating the results of the measured values, transmitting the data to at least one remote management system, and the like. The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in an embodiment a device, comprising an upper chamber vertically connected above a lower chamber, both connected chambers are located within a container, said container is designed to hold a liquid, a diaphragm gasket functioning as an elastic common-wall of said two connected chambers, designed to separate said two connected chambers, a first pressure sensor located at the lower chamber, wherein the upper chamber comprises tiny slots allowing the liquid in the container to enter the upper chamber and exert weight on the diaphragm gasket, thereby the diaphragm gasket exerts pressure on the lower chamber containing the first pressure sensor designed to measure the pressure exerted on the lower chamber.

There is provided, in an embodiment method, comprising connecting an upper chamber vertically above a lower chamber, both connected chambers located within a container, said container is designed to hold a liquid, placing a diaphragm gasket functioning as a an elastic common-wall of said two connected chambers, designed to separate said two connected chambers, placing a first pressure sensor located at the lower chamber, wherein the upper chamber comprises tiny slots allowing the liquid in the container to enter the upper chamber and exert weight on the diaphragm gasket, thereby the diaphragm gasket exerts pressure on the lower chamber containing the first pressure sensor designed to measure the pressure exerted on the lower chamber.

There is provided, in an embodiment a device, an upper chamber vertically located within a container, said container is designed to hold a liquid, said upper chamber is connected to an output connector, wherein the output connector is coupled to a pipe connecting to an input connector, said input connector comprises a first pressure sensor adapted to measure pressure, wherein the upper chamber comprises liquid received from the container, thus said upper chamber is designed to allow the liquid to flow via the output connector through the pipe thereby to exert pressure on a gas bubble trapped in a space of said input connector, wherein the pipe is connected to the input connector, such that said gas bubble exerts pressure on a first pressure sensor designed to measure the pressure conveyed from the liquid and exerted by the gas bubble.

There is provided, in an embodiment method, comprising, connecting an upper chamber vertically within a container, said container is designed to hold a liquid, placing an output connector from a lower side of the upper chamber, and coupling a pipe from the output connector to an input connector, placing a first pressure sensor located at the input connector, wherein said liquid flows via the output connector through the pipe thus exerts pressure on a gas bubble trapped in a space of said input connector and the pipe at an edge of the pipe connected to the input connector, and wherein said gas bubble exerts pressure on the first pressure sensor for measuring the pressure exerted by the liquid.

In some embodiments, the output connector, the pipe and the input connector are adapted to remain outside the container.

In some embodiments, the first pressure sensor is designed to measure pressure values, wherein said pressure values are indicative of the liquid level changes in the container.

In some embodiments, the pipe is bendable by a user.

In some embodiments, the lower chamber further contains air such that the upper chamber and exert weight on the diaphragm gasket, thereby the diaphragm gasket exerts pressure on the lower chamber containing the first pressure sensor designed to measure the pressure exerted on the lower chamber.

In some embodiments, the device presented herein is located at a bottom wall of said container.

In some embodiments, the device presented herein is embedded in a discharge valve of said container.

In some embodiments, the first pressure sensor is designed to measure pressure values, wherein said pressure values are indicative of the liquid level changes in the container.

In some embodiments, the first pressure sensor is an electronic pressure sensor operantly coupled to a circuit board and designed to measure values of pressure and transmit said measured values to the circuit board.

In some embodiments, the circuit board is operantly coupled to a second pressure sensor configured to measure the air pressure outside of the container.

In some embodiments, the circuit board is designed to calculate a net pressure value by reducing the pressure measured by the second pressure sensor from the pressure value measured by the first pressure sensor, and wherein the net pressure value is indicative of the liquid level in the container.

In some embodiments, the upper chamber is jointly formed by a cylinder-shaped hollow shaft and a cover, and wherein the tiny slots are positioned at the cover.

In some embodiments, the cover has a round-shaped cover causing the solid particles to glide around the cover and sink outside the sensor vicinity.

In some embodiments, the length of the tiny slots is between five millimeters and eight millimeters.

In some embodiments, the width of the tiny slots is between 0.5 millimeter and 1.0 millimeter.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

FIG. 3A shows a cross-sectional view of a device for measuring liquid level in a container, according to exemplary embodiments of the present disclosure;

FIG. 8B illustrates a cross-section view of a device designed to measure the pressure of the liquid for determining the liquid level in a container by using an external pipe, according to exemplary embodiments of FIG. 3A;

DETAILED DESCRIPTION

Figure 1:
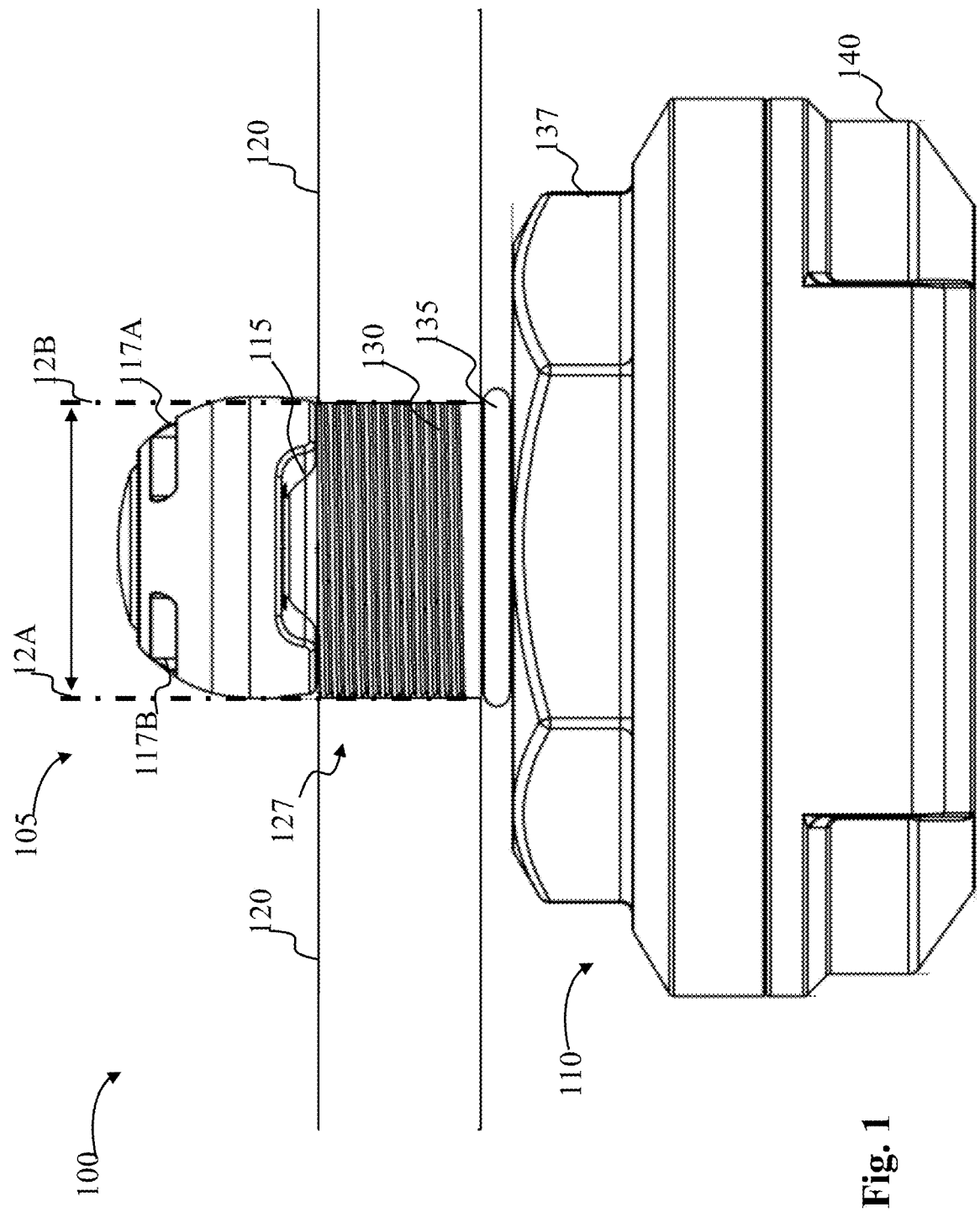
FIG. 1 depicts a device designed to measure the pressure of the liquid for determining the liquid level in a container, according to exemplary embodiments of the present disclosure.

Disclosed herein are a device and method designed for determining the liquid level in a container through measuring the pressure in the liquid by a pressure sensor located in the container within a protected form designed to prevent solid particles dispersed in the liquid from reaching the sensor.

In some embodiments, the device and method disclosed herein are used for measuring changes in the pressure at the bottom of the container, wherein the pressure changes are indicative of changes in the liquid level. In some embodiments, the measured pressure can be one or more pressure values measured in a continuously fashion by one or more pressure sensors.

In some embodiments, one or more calculation and/or computing methods are employed to determine the liquid level from the measured pressure values in the container in which the pressure sensor is located. Thus, in some embodiments, the pressure sensor can be electronic sensor connected to circuit board (e.g., circuit board 375) for collecting and calculating measured data, as elaborated further below.

Further, in some embodiments, the pressure sensor, e.g., the first pressure sensor, is designed to measure the weight exerted by the liquid held in the container as a way of measuring the pressure. Thus, in some embodiments, such a pressure sensor is designed to weigh the liquid at the bottom of the container and provide a corresponding pressure value. In some embodiments, converting weight values to pressure values may involve using the container sizes (e.g., the size of the bottom wall of the container) and/or using the density values of the liquid.

In some embodiments, disposing the pressure sensor at the bottom of the container can be achieved via embedding the pressure sensor in the discharge valve of the container.

The term "discharge valve" used herein refers to a valve, a bung, or a stopper inserted to one of the container walls in a fashion which seals the container. In some embodiments, the discharge valve can be a portable instrument inserted into the inner volume of a discharging port of the container thus preventing the liquid in the container from leaking or running out. In some embodiments, the discharge valve can be made of materials comprising plastic, metal and/or rubber.

In some embodiments, the device and method disclosed herein provides tools and applications for determining the liquid level in a container through measurements of the pressure of liquid comprising solid particles which are dispersed or suspended in the liquid. In some cases, such solids particles can sink and/or clump together into a floc which eventually creates a sludge or a layer of particles at the bottom of the container. Hence, the present disclosure provides for measuring the liquid pressure while preventing the sunk solid particles to interfere the pressure measurement operations.

In some embodiments, the present disclosure provides for measuring the liquid pressure within a container by a pressure sensor located at the bottom of the container in a protected form. In some embodiments, this protected form can be a cover forming an enclosure or a chamber designed to prevent the solid particles from arriving to the sensor, or to the vicinity of the sensor. Exemplary embodiments, employ a round-shaped cover, e.g., dome-shaped cover, causing the solid particles to slip or to glide on surface of the cover and land outside the vicinity of the sensor.

The term "vicinity of the sensor" used herein refers to an area which if it contains solid particles, the solid particles can impact at least some of the sensor operations, e.g., the operation of measuring the pressure of the liquid. Thus, an area enabling solid particles to arrive, reach or touch the sensor and interfere the sensor operations is defined as the vicinity of the sensor. In some cases, the impact of solid particle on the sensor operation may be one or more exemplary instances such as, interfering at least some of the moving parts of the sensor or the components thereof, changing the chemical balance in the vicinity of the sensor which expedites processes such as corrosion which over time corrode or erode the pressure sensor, and the like. In some embodiments, different sensors may require different area sizes to be determined as the vicinity of the sensor.

In some cases, diverse embodiments of the present disclosure can be implemented with different sizes of covers, wherein each size is particularly adapted to prevent solid particles from arriving or reach the vicinity of a particular sensor. In some embodiments, the cover can enclose an area thus form a chamber enabling the sensor measurement operation without the interference of the solid particles which have sunk to the bottom of the container.

In some embodiments, the present disclosure provides for enabling the liquid within the container to enter the cover thereby exert pressure on the pressure sensor. In some embodiments, the liquid entrance can be enabled by one or more tiny slots located on the cover. In some embodiments, the tiny slots can penetrate across the cover layer to enable ingress of liquid to a chamber residing beneath the cover and exert pressure on the pressure sensor, while the tiny slots are preventing solid particles from entering the cover.

In some embodiments, additional protecting mechanism is applied to prevent liquid which are present in the chamber from contact with the pressure sensor, e.g., to prevent processes which erode or wear-out the pressure sensor. Thus, the pressure sensor can be located beneath a flexible gasket positioned to receive the pressure exerted by the liquid entered the cover and residing in the chamber, in a way that bends the flexible gasket, thereby the flexible gasket transfers the pressure to the pressure sensor, while the liquid cannot touch the sensor.

In some embodiments, the pressure sensor embedded in the discharge valve can be an electronic pressure sensor designed to transmit the measured pressure values to a central system designed to calculate, process and/or display the pressure values. In some embodiments, the electronic pressure sensor is coupled with a circuit board designed to receive the values measured by the pressure sensor and transmit the received values to the central system. In some embodiments, converting the pressure values to liquid level values is performed by the circuit board (e.g., circuit board 375).

In some embodiments, measuring and calculating the pressure values can involve measuring the pressure exerted by the liquid on one pressure sensor (e.g., first pressure sensor 355A) and reducing the atmospheric pressure measured by another pressure sensor (e.g., second pressure sensor 355B).

Further, in some embodiments, the liquid pressure value can be achieved by two different reference pressures, wherein the first pressure sensor measures the liquid pressure value, and the second pressure sensor measures the atmosphere pressure value. In some embodiments, the method of measuring the liquid pressure can involve reducing the atmosphere pressure value from the liquid pressure value and thereby determine the net pressure value of the liquid.

In some embodiments, the net pressure value of the liquid can be converted to the level of the liquid within the container.

In some embodiments, the pressure sensors, the circuit board and the cover thereof can be embedded into the discharge valve, such that, opening the discharge valve, e.g., where the container is empty, can enable maintenance operations. In some embodiments, such maintenance operations can be at least one operation such as: cleaning the sludge and/or the sunk solid particles, replacing and/or fixing the power source in cases the sensor is an electronic sensor, replacing the sensor in cases the sensor is damaged, and the like.

The present disclosure is not limited to the embodiments described above, but it can be realized, modified and indicated in examples described further below.

Reference is made to FIG. 1 depicting a device designed to measure the pressure of the liquid for determining the liquid level in a container, according to exemplary embodiments of the present disclosure. FIG. 1 depicts a device 100 which in some embodiments is designed for determining the liquid level according to pressure measurements. Device 100 comprises a shaft 127 which in some embodiments, can be a cylinder-shaped hollow shaft connected to a cover 105 at one edge of the cylinder, denoted as an upper edge. In some embodiments, shaft 127 is also mounted to a discharge valve 110 at the other edge of the cylinder, denoted as a lower edge.

Figure 2:
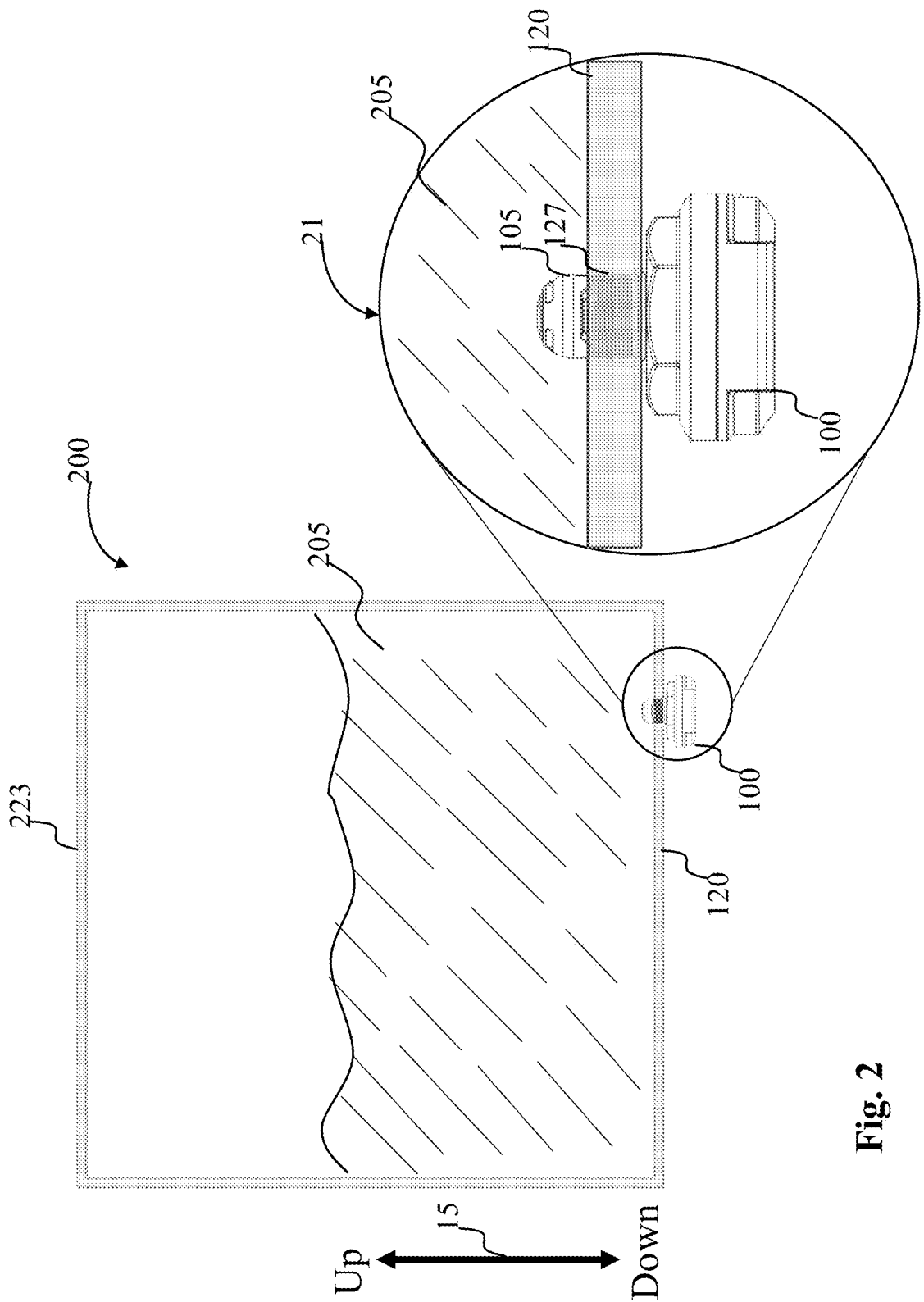
FIG. 2 depicts a container holding liquid with a device designed to measure the pressure of the liquid for determining the liquid level in a container, according to exemplary embodiments of the present disclosure.

In some embodiments, the shaft 127 comprises screw thread 130 designed to be screwed into an opening in the container bottom wall 120 (e.g., as shown in FIG. 2) thereby fasten the shaft 127 to the container bottom wall 120. In some embodiments, the opening in the container bottom wall 120 can be a discharging port utilized to empty the container.

In some embodiments, the shaft 127 extends lengthwise through the opening in the container bottom wall 120 thus situates the cover 105 within the container inner space. In some embodiments, the shaft 127 is designed to situate the entire cover 105 within the inner space of the container (not shown). In some embodiments, the diameter of the opening in the container bottom wall 120 can be designed to accommodate the shaft 127 in a way which seals the opening in the container bottom wall 120, as shown by the imaginary lines 12A and 12B depicting the boundaries of the opening in the container bottom wall 120. In some embodiments, such an opening in the container bottom wall 120 may comprise screwing mechanism designed to accommodate the screw thread 130.

In some embodiments, the device 100 is designed to house within, one or more sensors, e.g., pressure sensor (not shown). In some embodiments, the pressure sensor can be housed in the cavity of the hollow shaft 127. In some embodiments, the pressure sensor can be located within the discharge valve 110.

In some embodiments, cover 105 comprises one or more tiny slots, e.g., upper slots 117A and 117B, and side slot 115 designed to enable liquid to enter through the cover 105. In some embodiments, the liquid entered to the cover 105 through the tiny slots thereof can enter into the hollow shaft 127 and exert pressure on the pressure sensor located within the device 100, as elaborated further below.

In some embodiments, additional slots may be located on the cover 105. In some embodiments, less tiny slots then shown in FIG. 1 are located on the cover 105. In some embodiments, the number of tiny slots and/or the size thereof may be determined according to the type, and/or the density of the liquid held within the container. In some embodiments, the number and/or the size of the tiny slots is determined to enable free ingress of the liquid through the tiny slots.

In some embodiments, the cover 105 is a round-shaped cover which can be connected to the upper edge of the shaft 127. In some embodiments, the shaft 127 and the cover 105 may be connected by an adhesive material that seals the connection junction between them. In some embodiments, the shaft 127 and the cover 105 may be connected by soldering. In possible embodiments, the shaft 127 and the cover 105 may be connected by a screwing mechanism, e.g., screw-thread, which fastens the shaft 127 and the cover 105 together.

In some embodiments, the cover 105 is shaped to prevent solid particles sinking to the container bottom, from arriving to the pressure sensor located within the device 100 (the pressure sensor is not shown). In some embodiments, the cover 105 is shaped to prevent solid particles sinking to the container bottom, from arriving to the vicinity of the pressure sensor located within the device 100. In such embodiments, the tiny slots such as the upper slots 117A and 117B, and side slot 115 are adapted such that the liquid can enter into the space of the shaft 127 while solids particles dispersed or suspended in the liquid are prevented from entering in. In some embodiments, the round shaped cover 105 can cause the solid particles to glide on surface of the cover 105 and land outside the vicinity of the pressure sensor located within the device 100.

In some embodiments, the discharge valve 110 comprises a ring gasket 135 which can surround the shaft 127. In some embodiments, the diameter of the ring gasket 134 is larger than the diameter of the opening in the container bottom wall 120, as shown by the imaginary lines 12A. In some embodiments, the size of the diameter of the ring gasket 134 allows to seal the container bottom wall 123 by remaining outside to the opening and thereby seal the contact interfaces between discharge valve 110 and the container bottom wall 123.

In some embodiments, the discharge valve 110 comprises a nut-shaped member 137 adapted for screwing the discharge valve 110 with any tool used for gripping the nut-shaped member 137 and turning the discharge valve 110 clockwise or counterclockwise, e.g., a wrench.

In some embodiments, the discharge valve comprises a handle member 140 shaped to allow holding and hand gripping of the discharge valve 110. In some embodiments, the handle member 140 can be used to open and/or close the discharge valve 110. In some exemplary cases, opening the discharge valve is required for maintenance operations as aforementioned.

Reference is made to FIG. 2 depicting a container holding liquid with a device designed to measure the pressure of the liquid for determining the liquid level in a container, according to exemplary embodiments of the present disclosure. FIG. 2 shows a container 200 designed to hold liquid such as liquid 205. In some embodiments, the container 200 can be a liquid storage tank, a vessel, reservoir, or any receptacle for holding liquid.

Container 200 schematically depicted in FIG. 2 can be a facility designed for holding and/or storing liquid or in some cases fluids. In some embodiments, the container 200 can be a fixed facility located at a geographical location. In some embodiments, container 200 can be a tank such as a fuel tank designed for holding and storing fuel, or a chemical substance. In some embodiments, container 200 can be implemented as a closed container designed to enclose a perimeter for holding the liquid. In some embodiments, container 200 can be a reservoir, or an open facility, e.g., a half reservoir or a reservoir without the top wall 223 enclosing the space within the container 200 from the top. In some embodiments, container 200 can be a portable facility which can be easily carried or moved. For example, container 200 can be can be a fuel tank of a vehicle or a motorcycle.

Container 205 comprises a discharge valve 100 fastened into the container bottom wall 120. In some embodiments, the discharge valve 100 can be used to empty the container 200. Further, FIG. 2 illustrates the position of the discharge valve 100 with respect to the entire container 200 in a magnified view 21. The magnified view 21 shows the container bottom wall 120 and the discharge valve 100 inserted into the container bottom wall. In some embodiments, the discharge valve 100 comprises shaft 127 which can be inserted into the bottom wall 120 thus positioning the cover 105 within the liquid 205.

In some embodiments, discharge valve 100 the shaft 127 and the cover 105 can be integrated into one device utilized to measure pressure values within the container 205. In some embodiments, the measured pressure values can be utilized to calculate and determine the liquid level within the container 205.

In some exemplary embodiments, the shaft 127 and the cover 105 can be connected in a standalone device (not shown) which can be separated from the discharge valve 100. In such an exemplary embodiment, such a device comprising the shaft 127 and the cover 105 can measure the pressure exerted by the liquid held in the container as a standalone and independent device. Furthermore, in such exemplary embodiments, the discharge valve 100 can be any standard discharge valve apricated by a person having ordinary skills in the art, and the device measuring the pressure is embedded in a box or enclosure (not shown) and located at the bottom wall 120.

Reference is made to FIG. 3A showing a cross-sectional view of a device for measuring liquid level in a container, according to exemplary embodiments of the present disclosure. FIG. 3A shows a device 100 which in some embodiments, is designed for calculating and/or determining the liquid level according to pressure measurements. FIG. 3A also shows device 300 shown as a cross-sectional view of device 100, wherein the section is crossed along the axis 31 with a view provided according to the direction pointed by arrows 41 and 42. Device 300 comprises a shaft 310 connected to a cover 305 and coupled to a discharge valve 340.

In some embodiments, device 300 comprises the shaft 310 connected by the upper edge thereof to the cover 305 and coupled with lower edge thereof to the discharge valve

340. In some possible embodiments, all three components shaft 310, cover 305 and discharge valve 340 can be provided in one-piece consolidating the functionalities of all three components shaft 310, cover 305 and discharge valve 340 in one device. For example, such a unified device can be produced by molding plastic to obtain one unified device comprising all three components mentioned above.

In some embodiments, the cover 305 comprises one or more tiny slots as shown by the upper slot 330 located at top part of the cover 305. The cover 305 can also comprise a side slot 325 located at the side of the cover 305. In some embodiments, the upper slot 330 and the side slot 325 are arranged such that, the distance between the upper edge of shaft 310 marked by axis 52 is longer than the distance between the side slot 325 and the upper edge of shaft 310.

In some embodiments, the tiny slots of cover 305 can extend through the cover 305 and reach the upper chamber 320. Thus, in some embodiments, liquid held in the container can enter via the tiny slots of cover 305 and fill the upper chamber 320. In some embodiments, the upper chamber 320 is formed by the wall of the cover 305 and the cylinder-shaped wall of shaft 310. In some embodiments, the cover 305 can be a round-shaped, e.g., dome-shaped structure coupled with the shaft 310 and therewith forms the upper chamber 320.

In some embodiments, the cover 305 comprises one or more upper slots such as the upper slot 330 and one or more side slots such as the side slot 325. In some embodiments, the cover 305 is a round-shaped structure which can cause the solid particles landing on the cover 305 to glide along the round-shaped structure without entering into the tiny slots thereof.

In some embodiments, the cover 305 comprises a protuberance 315 which can be fastened into the socket 317. In some embodiments, cover 305 comprises protuberances such as a protuberance 315 which can be fastened into sockets such as socket 317 located on the edge of shaft 310 and protruded vertically above the edge of shaft 310 marked by axis 52.

In some embodiments, protuberances such a as protuberance 315 and sockets such as socket 317 provide a lock mechanism to fix and lock the cover 305 to the shaft 310. In some embodiments, the cover 305 can be designed to be pressed toward shaft 310 with at least a threshold force required to overcome the resistance exerted by the protuberance 315 thereby causing protuberance 315 to be pushed to a position facing toward the socket 317 and penetrate therein.

Accordingly, in some embodiments, the present disclosure can be implemented with one or more protuberances such as protuberance 315 each of which can be placed into a socket such as socket 317. In some embodiments, this mechanism based on protuberances pressed into sockets which locks the cover 305 onto shaft 310, enables forming a unified structure with a space.

In some embodiments, the unified structure formed by cover 305 and the shaft 310 form the upper chamber 320, wherein ingress of liquid into the upper chamber 320 is enabled by tiny slots such as the upper slot 330 and the side slot 325.

In some embodiments, diverse means for connecting the cover 305 and the shaft 310 can be implemented. In some embodiments, such means can be threading mechanism wherein one of the parts (e.g., shaft 310) screws into the other part (e.g., cover 305).

In some embodiments, shaft 310 is attached or mounted on the discharging valve 340. In some embodiments, the lower edge of shaft 310 marked by axis 51 can be glued or soldered to the upper edge of the discharging valve 340, also marked by axis 51. In some embodiments, the shaft 310 and the discharging valve 340 can be molded in one-piece.

In some embodiments, the discharging valve 340 comprises a cavity 323 which can join to the upper chamber 320.

In some embodiments, the discharging valve 340 comprises a diaphragm gasket 345 positioned to seal the upper chamber 320. In some embodiments, the diaphragm gasket 345 is a flexible diaphragm gasket capable of bending and/or moving elastically. In some embodiments, the diaphragm gasket 345 can be provided from a flexible material, e.g., silicon or rubber, capable of bending and/or moving elastically due to the pressure exerted by the weight of the liquid held in the upper chamber 320, without breaking. In some embodiments, the diaphragm gasket 345 material and structure are also provided with the ability to seal the upper chamber 320 thereby prevent the liquid held in the upper chamber 320 from leaking out through the interface areas between the diaphragm gasket 345 and the upper chamber 320.

In some embodiments, diaphragm gasket 345 prevents liquid held in the upper chamber 320 from leaking or flowing out through the interface areas between the diaphragm gasket 345 and the wall, or walls, forming the upper chamber 320.

In some embodiments, the discharging valve 340 comprises lower chamber 350 designed to hold gas, such as air. In some embodiments, the diaphragm gasket 345 can enclose the space with the lower chamber 350 from the top. In some embodiments, the lower chamber 350 comprises a first pressure sensor 355A located at the bottom, or close to the bottom of the lower chamber 350, such that the air held in the lower chamber 350 which in some cases being pressed by the diaphragm gasket 345 exerts pressure on the first pressure sensor 355A.

In some embodiments, the structure formed by the discharging valve 340, the shaft 310 and cover 305 enables operating a mechanism comprising two adjoining chambers, the upper chamber 320 and lower chamber 350 located vertically one above the other, and separated by a diaphragm gasket 345 functioning as a an elastic common-wall of said two adjoining chambers, wherein the upper chamber 320 contains liquid and designed to enable the liquid to exert a weight on the diaphragm gasket 345, thereby the diaphragm gasket 345 exerts pressure on the lower chamber 350 containing air pushed against the first pressure sensor 355A designed to measure the pressure exerted by the air.

Accordingly, in some embodiments, the pressure exerted on the diaphragm gasket 345 by the liquid weight can cause the diaphragm gasket 345 to elastically move into to the lower chamber 350 and exert pressure on the first pressure sensor 355A corresponding to the pressure exerted by the liquid weight. Hence, in possible embodiments, some of the objectives of the diaphragm gasket 345 is to function as the interface between the upper chamber 320 and the lower chamber 350 and to seal the bottom of the upper chamber 320 such that, the pressure exerted by the liquid enters to the upper chamber 320 through the tiny slots is relatively compatible to the pressure exerted by the liquid held in the container, outside of the upper chamber 320.

In some embodiments, the upper chamber 320, the lower chamber 350 with diaphragm gasket 345 functioning as an elastic common-wall between them creates a structure which maintain an equilibrium state where the pressure in the upper chamber 320 is essentially equal to the pressure in the lower chamber 350. In some embodiments, this equilibrium state enables the first pressure sensor 355A to measure a pressure value which is essentially equal to the pressure in the container.

In some embodiments, the first pressure sensor 355A designed to measure the pressure in the lower chamber 350 can be an electronic sensor designed to measure pressure by electrical means designed to generate data represented by electrical signals, wherein the data comprises the values measured by the pressure sensor 355A. In some embodiments, the data of the first pressure sensor 355A can be generated mechanically or electrically.

In some embodiments, the first pressure sensor 355A is connected to a circuit board 375. In some embodiments, the circuit board 375 can be an electrical component assembly, e.g., printed electrical board, designed to receive the electrical signals from the first pressure sensor 355A.

In some embodiments, the circuit board 375 can receive the electrical signals of the first pressure sensor 355A and transmit these signals further, e.g., to a controller or a computerized device designed to receive signals, capture and analysis these signals.

In some embodiments, the circuit board 375 comprises a standalone power source, e.g., a battery, required to operate the pressure sensor 355A and the electrical components of the circuit board 375. In some embodiments, the circuit board 375 can be connected via cable to an external power source. In such embodiments, the cable can be a power cable connected to power source such as a battery, or a power grid.

In some embodiments, the circuit board 375 and the component thereof comprise computer readable program instructions for causing a processor of the circuit board 375 to carry out aspects of the present invention. In some embodiments, the circuit board 375 can comprise a computer readable storage medium that can retain and store such computer readable program instructions. In some embodiments, the circuit board 375 can comprise an execution device designed to carry out aspects of the present invention by executing one or more of the computer readable program instructions.

In some embodiments, the circuit board 375 and the component thereof comprise program instructions to calculate the pressure out of the weight value received from the pressure sensor 355A. In some embodiments, the program instructions may implement one or more algorithms to calculate the pressure values, reducing one pressure value from another pressure value, and the like.

In some embodiments, the circuit board 375 and the component thereof comprise program instructions to determine the liquid level out from pressure values through calculations and/or value comparison. In some embodiments, the program instructions may utilize density values of the liquid for calculating and/or determining the liquid level from the pressure values.

In some embodiments, a second pressure sensor 355B can be connected to the circuit board 375 designed to measure the pressure of the atmosphere. In some embodiments, the second pressure sensor 355B can be attached to the third chamber 360 for measuring the pressure exerted by air in the atmosphere. In some embodiments, the third chamber 360 comprises air inserting to via aperture 365 allowing atmosphere air (e.g., air from the outside of the container) to enter without obstacles into the third chamber 360, thus the pressure measured in the third chamber 360 can be essentially similar to the pressure measured in the atmosphere.

In some embodiments, the second pressure sensor 355B can be an electronic sensor designed to measure pressure by electrical components. In some embodiments, the data of the second pressure sensor 355B can be measured mechanically or electrically. In some embodiments, the second pressure sensor 355B can also transmit the pressure data by creating electrical signal representing the measured value.

In some embodiments, the circuit board 375 can receive the electrical signals of the second pressure sensor 355B and transmit the electrical signals further, e.g., to a signal.

In some embodiments, measuring and calculating the pressure values can involve measuring the pressure exerted by the liquid on the first pressure sensor 355A and reducing the atmospheric pressure measured by the second pressure 355B. In some embodiments, the values measured by the two sensors, first pressure sensor 355A and second pressure sensor 355B can be calculated by reducing the atmosphere pressure value measured by the second pressure 355B, from the liquid pressure value measured by the first pressure sensor 355A for calculating the net pressure value of the liquid.

In some embodiments, the circuit board 375 is operated synchronously with the microcomputer's clock which enables a synchronization of the values measured by the first pressure sensor 355A and the second pressure 355B, according to a real-time clock. In some embodiments, such a synchronization is required for calculating the liquid level wherein the values are measured by the first pressure sensor 355A and by the second pressure 355B, essentially at the same point in time.

In some embodiments, the calculations of the net pressure can be accomplished by an external computer configured to receive the pressure values measured by the first pressure sensor 355A and by the second pressure 355B, from the circuit board 375.

In some embodiments, calculating the net pressure value of the liquid can be performed by the circuit board 375 which first receives the pressure values from the pressure sensors, as aforementioned, and calculates the net pressure value, or the net pressure values. In some embodiments, the circuit board 375 and the computer readable program instructions thereon comprise the algorithm and/or the instructions required to convert the net pressure values to a liquid level in the container.

In some embodiments, the net pressure value and/or the liquid level calculated by the circuit board 375 can be transmitted to an external computer for storing, displaying and further calculations.

In some embodiments, the circuit board 375, the first pressure sensor 355A and the second pressure 355B, can be function as a differential pressure sensor designed to measure pressure in two different reference pressures, the first pressure sensor 355A and the second pressure sensor 355B and calculate the net pressure value of the liquid according to the measured pressure values.

In some embodiments, the circuit board 375 is configured with communication means and/or a network adapter designed for transmitting the data received and/or calculated by the circuit board 375 to an external computer or external storage device via a network. For example, a wireless adapter e.g., Wi-Fi, or Bluetooth and/or an adapter for wired communication.

In some embodiments, the circuit board 375 can transmit data to a central system for further calculation, gathering the data, displaying the data and the like. In some embodiments, such a communication can be via a network, for example, the interne, a local area network, a wide area network and/or a wireless network. In some embodiments, the network may comprise copper transmission cables, optical transmission fibers, wireless transmission, routers, firewalls, switches, gateway computers and/or edge servers.

In some embodiments, the entire device 300 can be screwed into an opening in the container bottom such that the cover 305 is protruded in from the container bottom into the container volume. In some embodiments, the opening in the container bottom wall, e.g., container bottom wall 120, can be a discharging port utilized to empty the container. In some embodiments, the ring gasket 370 can seal the opening in the container bottom wall and prevent leaking from that opening.

Figure 3B:
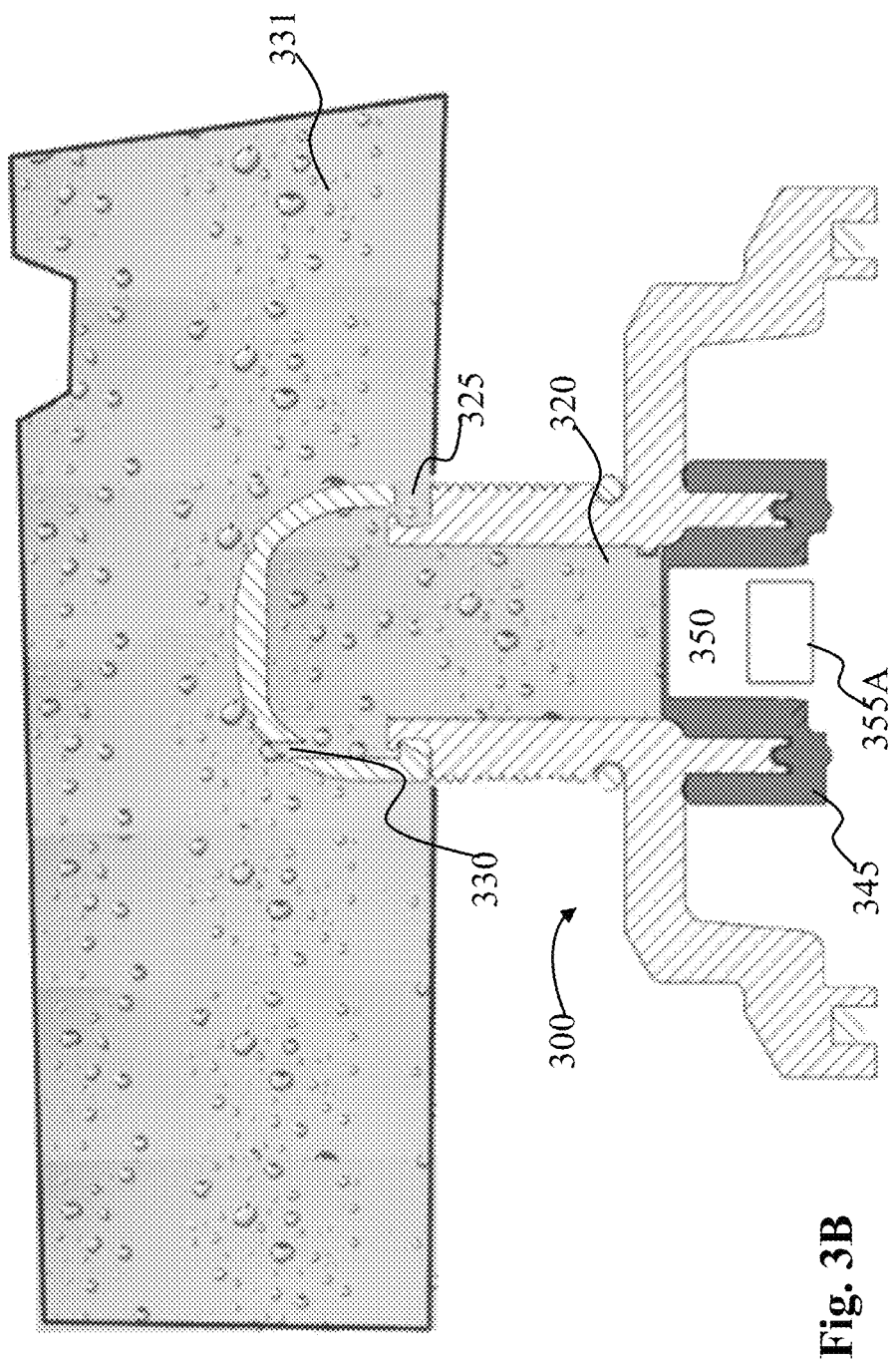
FIG. 3B illustrates a presence of liquid in a device designed for measuring liquid level in a container, according to FIG. 3A.

Reference is made to FIG. 3B illustrating the presence of a liquid in a device designed for measuring liquid level in a container, according to FIG. 3A. FIG. 3B shows a cross-sectional view of a device 300 designed for measuring liquid level in a container. FIG. 3B illustrates the presence of the liquid 331 which in some cases can be the liquid in a container (not shown), as aforementioned.

In some embodiments, the liquid 331 can enter into the upper chamber 320 through the upper slot 330 and the side slot 325. In some embodiments, the upper chamber 320 and the side slot 325 are designed such that the pressure exerted by the liquid 331 outside of the upper chamber 320 is essentially equal to the pressure exerted by the liquid 331 within the upper chamber 320.

In some embodiments, the liquid 331 can exert pressure on the diaphragm gasket 345 which seals the upper chamber 320. In some embodiments, the diaphragm gasket 345 can transfer the pressure exerted thereon to air residing within the lower chamber 350. In some embodiments, the pressure transferred to the lower chamber 350 can be measured by the first pressure sensor 355A.

Figure 4:
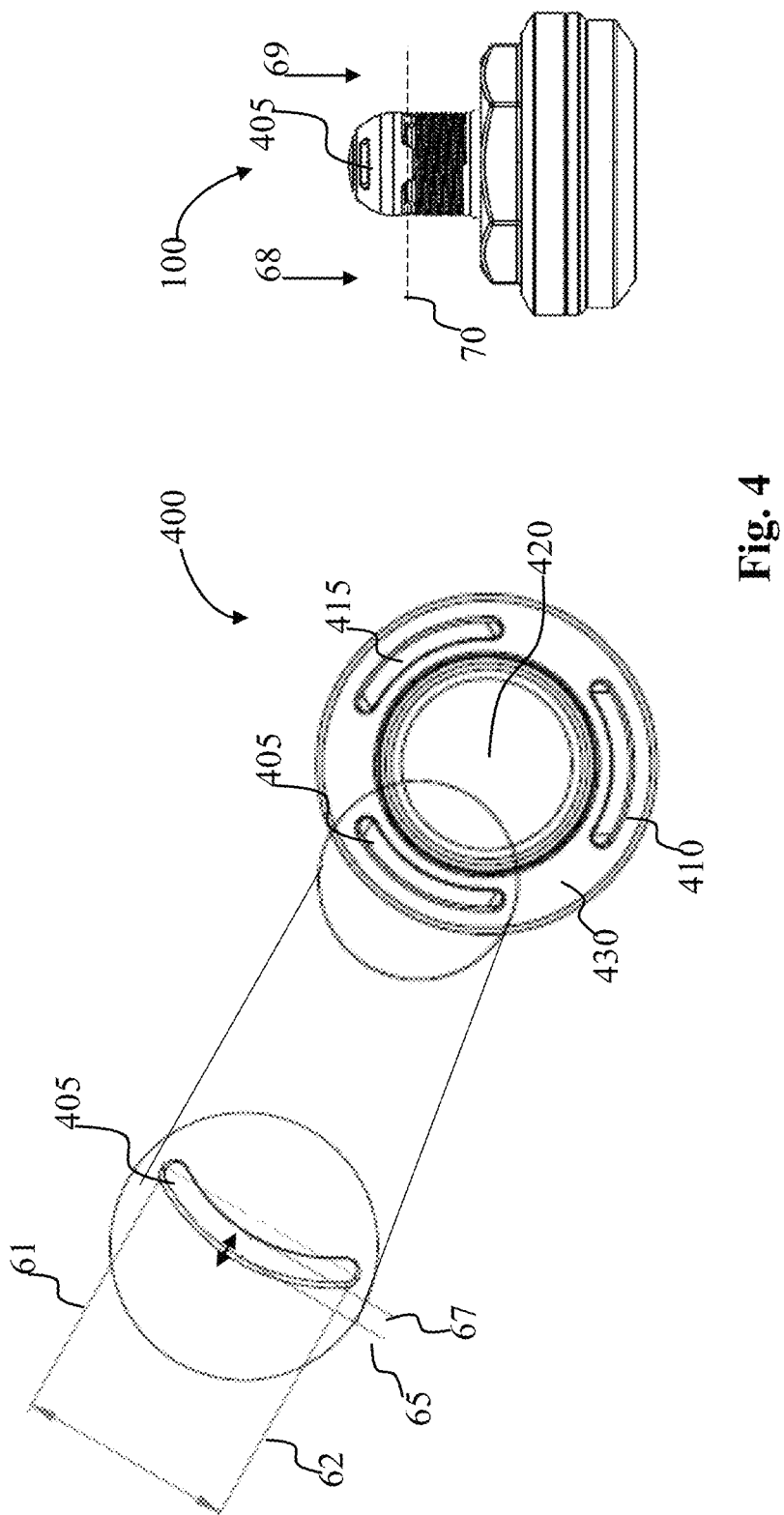
FIG. 4 shows a cross-sectional upper view of a device designed to measure the pressure of the liquid for determining the liquid level in a container, according to exemplary embodiments of the present disclosure.

Reference is made to FIG. 4 showing a cross-sectional upper view of a device designed to measure the pressure of the liquid for determining the liquid level in a container, according to exemplary embodiments of the present disclosure. FIG. 4 shows a device 100 which in some embodiments, is designed for calculating the liquid level according to pressure measurements. FIG. 4 also shows device 400 shown as a cross-sectional upper view of device 100, wherein the section is cut along the axis 70 with a view provided with the direction pointed by arrows 68 and 69.

The device 400 comprises upper slots 405, 410, and 415, roundly located within the wall of device 400 (e.g., within the cylinder-shaped wall of shaft 310). In some embodiments, the upper slots 405, 410, and 415 extend downwards (namely to the direction pointed by arrows 68 and 69) and consolidate with the upper chamber 420 (the junction areas of the upper slots 405, 410, and 415 and the upper chamber 420 are not shown). In some embodiments, the upper slots 405, 410, and 415 are positioned to enable liquid held in the container to flow into the upper chamber 420 thereby exerting pressure on the diaphragm gasket (e.g., diaphragm gasket 345, not shown).

FIG. 4 illustrates the upper slots 405. In some embodiments, the length of the upper slots 405 measured between one edge and the counter edge of the upper slots 405 as shown between axis 61 and axis 62 can be between 5 (five) millimeters and 8 (ate) millimeters. In some embodiments, the length between one edge and the counter edge of the upper slots 405 as shown between axis 61 and axis 62 can be exact 7.18 millimeters.

In some embodiments, the width of the upper slots 405 measured between one side and the counter side of the upper slots 405 as shown between axis 65 and axis 67 can be between 0.5 millimeter and 1.0 millimeter. In some embodiments, the width between one side and the counter side of the upper slots 405 as shown between axis 65 and axis 67 can be exact 0.8 millimeter.

In some embodiments, upper slots can be provided in diverse sizes. In some embodiments, the size of upper slots 410, and 415 can be similar to the size of the upper slots 405. In some embodiments, the size of upper slots 405, 410, and 415 are determined to accommodate a target size of solid particles expected to be in the liquid.

In some embodiments, the device 400 may comprise more than three upper slots. In some embodiments, the device 400 may comprise one or two upper slots. In some embodiments, the device 400 may comprise one or more upper slots (not shown). In some embodiments, the device 400 may comprises only one or more upper slots without any side slots.

Figure 5:
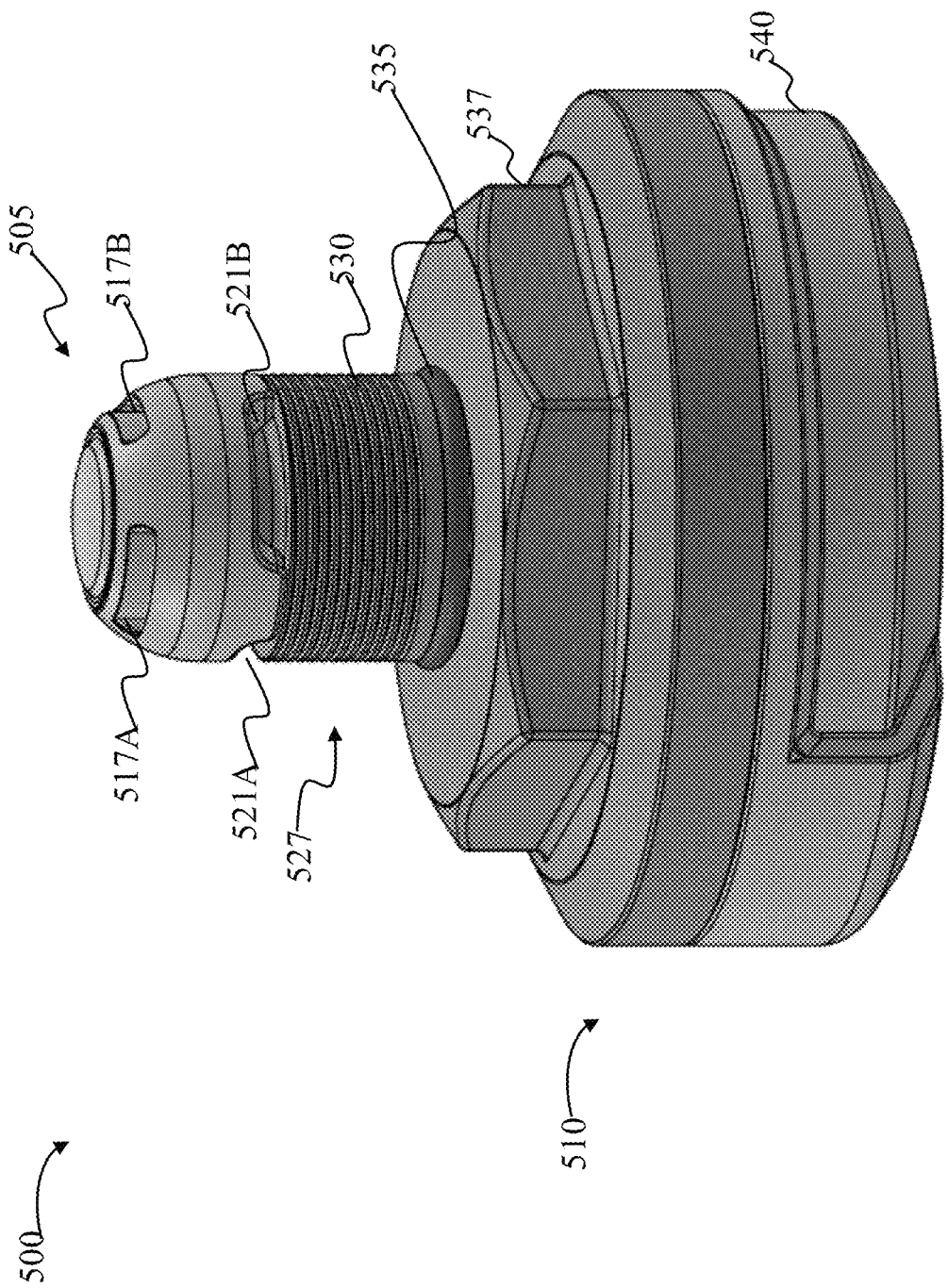
FIG. 5 illustrating a three-dimensional view of a device designed to measure the pressure of the liquid for determining the liquid level in a container, according to exemplary embodiments of the present disclosure.

Reference is made to FIG. 5 illustrating a three-dimensional view of a device designed to measure the pressure of the liquid for determining the liquid level in a container, according to exemplary embodiments of the present disclosure. FIG. 5 illustrates a device 500 which in some embodiments is designed for determining the liquid level according to pressure measurements.

In some embodiments, device 500 comprises a shaft 527 which is a cylinder-shaped hollow shaft connected at the upper edge thereof to a cover 505. Shaft 527 is also mounted to a discharge valve 510 at the lower edge thereof, as aforementioned.

In some embodiments, the shaft 527 comprises screw thread 530 designed to be screwed into an opening in the container bottom, e.g., as shown in FIG. 2 thereby fasten the shaft 527 to the container bottom wall, as aforementioned.

In some embodiments, cover 505 comprises some tiny slots, e.g., upper slots 517A and 517B, and side slots 521A and 521B designed to allow the liquid to enter through the cover 505. In some embodiments, the liquid entered to the cover 505 through the tiny slots thereof can enter into the cavity of the hollow shaft 527 and exert pressure on the pressure sensor located within the device 500.

In some embodiments, the discharge valve 510 comprises a ring gasket 535 which can surround the shaft 527. In some embodiments, the size of the diameter of the ring gasket 134 allows to seal the container bottom wall by remaining outside to the opening and thereby seal the contact interfaces between discharge valve 510 and the container bottom wall.

In some embodiments, the discharge valve 510 comprises a nut-shaped member 537 adapted for screwing the discharge valve 510 with any tool used for gripping the nut-shaped member 537 and turning the discharge valve 510 clockwise or counterclockwise, e.g., a wrench.

In some embodiments, the discharge valve 510 comprises a handle member 540 shaped to allow holding and hand gripping of the discharge valve 510. In some embodiments, the handle member 540 can be used to open and/or close the discharge valve 510. In some exemplary cases, opening the discharge valve is required for maintenance operations as aforementioned.

Figure 6:
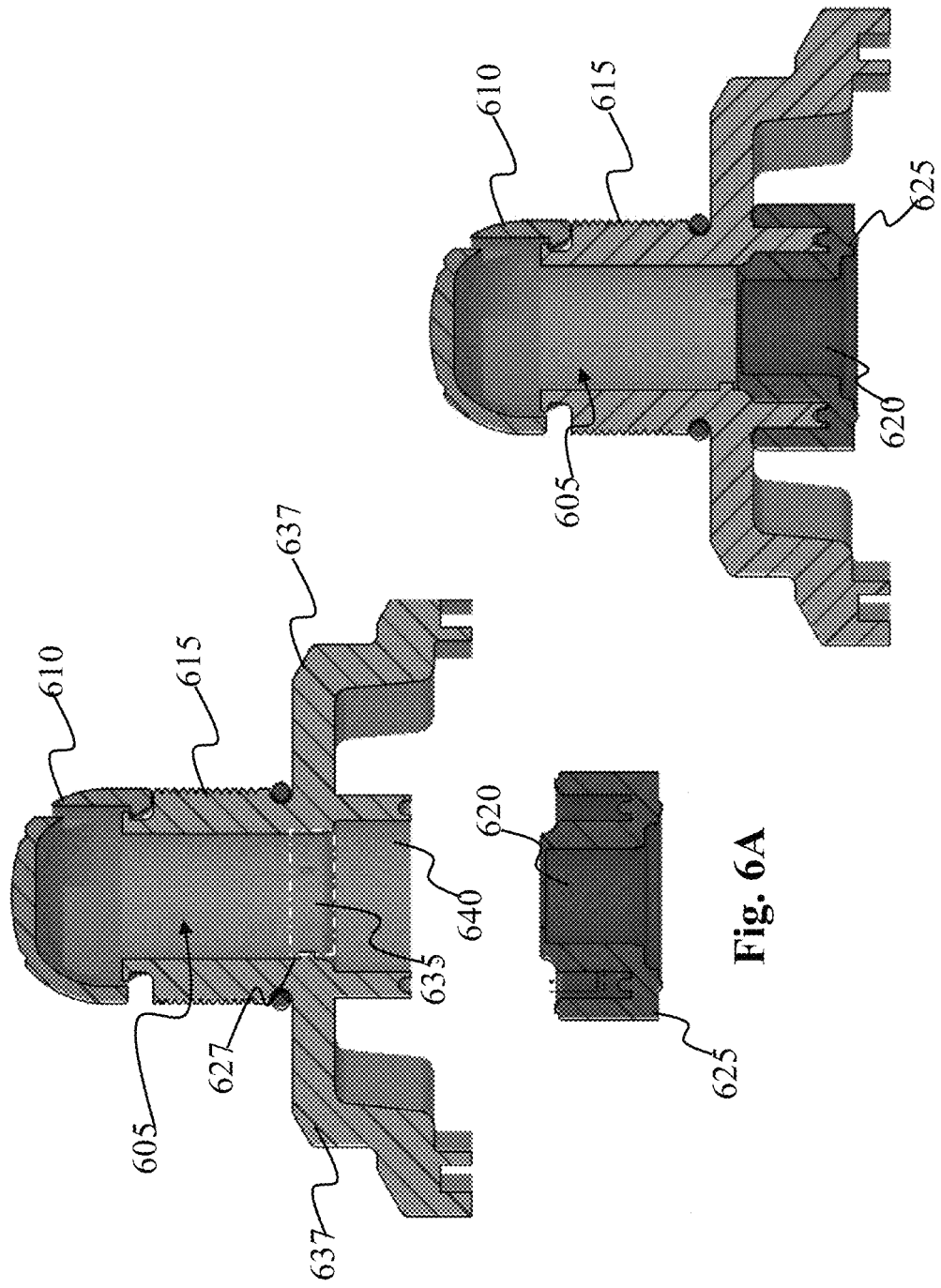
FIGS. 6A-6B show a cross-sectional view of an assembly of components adapted to form the upper chamber and the lower chamber of a device designed to measure the pressure of the liquid for determining the liquid level in a container, according to exemplary embodiments of the present disclosure.

Reference is made to FIGS. 6A-6B showing a cross-sectional view of an assembly of components adapted to form the upper chamber and the lower chamber of a device designed to measure the pressure of the liquid for determining the liquid level in a container, according to exemplary embodiments of the present disclosure. FIGS. 6A-6B show an upper chamber 605 formed by a cover 610 and shaft 615. The upper chamber 605 also comprise cavity 635 which can be a part of the nut-shaped member 637. In some embodiments, the boundaries of cavity 635 can be as shown in the imaginary rectangle 627.

In some embodiments, the nut-shaped member 637 can be a part of the discharge valve (no shown in its entirely). FIGS. 6A-6B demonstrate an exemplary embodiment wherein shaft 615 and nut-shaped member 637 are provided in one-piece. Thus, in some embodiments, the shaft 627 and the nut-shaped member 637 can be molded in one-piece.

In some embodiments, the shaft 627 and the nut-shaped member 637 may be connected by an adhesive material that seals the connection junction between them. In some embodiments, the shaft 627 and the nut-shaped member 637 may be connected by soldering. In possible embodiments, the shaft 627 and the nut-shaped member 637 may be connected by a screwing mechanism, e.g., screw-thread, which fastens the shaft 627 and the nut-shaped member 637 together.

FIGS. 6A-6B also show a cross-sectional view of a lower chamber member 625 comprising the lower chamber 620. FIG. 6A shows the lower chamber member 625 apart from the nut-shaped member 637. FIG. 6B shows the lower chamber member 625 connected to the nut-shaped member 637.

In some embodiments, the lower chamber member 625 can be inserted into a hollow member 640 of the nut-shaped member 637 in a manner which fastens the lower chamber member 625 to the nut-shaped member 637 thereby forming a structure comprising a lower chamber 620 and an upper chamber 605 as shown in FIG. 6B.

Figure 7:
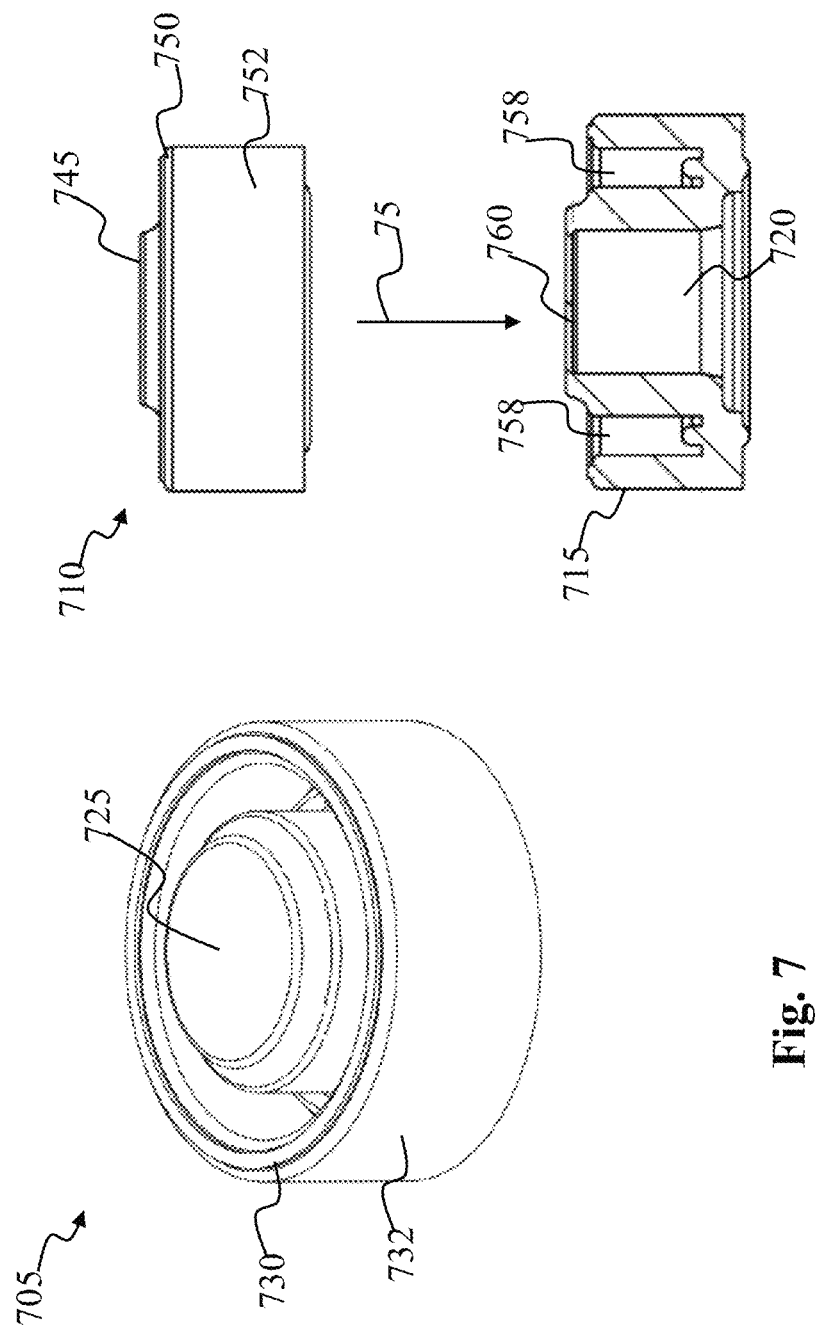
FIG. 7 shows a diaphragm gasket and a lower chamber member, according to exemplary embodiments of the present disclosure.

In some embodiments, the lower chamber member 625 is a round-shaped component which can be fastened into a hollow member 640 in a manner which remains a space for a diaphragm gasket, e.g., diaphragm gasket 705 in FIG. 7, to divide the hollow area formed by the lower chamber 620 and an upper chamber 605 to two separated chambers, wherein the diaphragm gasket seals the passage between these two chambers.

Reference is made to FIG. 7 showing a diaphragm gasket and a lower chamber member, according to exemplary embodiments of the present disclosure. FIG. 7 shows an upper view of diaphragm gasket 705, a lateral view of diaphragm gasket 710 and a cross-sectional view of a lower chamber member 715 comprising at least part of the lower chamber 720.

The diaphragm gasket 705 comprises a top part 725 designed to connect to an upper chamber (not shown) thereby seal the upper chamber.

The diaphragm gasket 705 also comprises a circumferential part 730 and a wall member 732 designed to coat the lower member 720.

The diaphragm gasket 710 comprises a top part 725, a circumferential part 750 and a wall member 752. The diaphragm gasket 710 can be designed to coat the lower chamber member 715, wherein the top part 725 encloses the lower chamber 720 at the lower chamber top-section 760. In some embodiments, the diaphragm gasket 710 can be mounted onto the lower chamber member 715 through pushing the diaphragm gasket 710 in the direction indicated by arrow 75 and the inserting wall member 752 into circular groove 758, thus diaphragm gasket 710 coats the lower chamber member 715.

Figure 8A:
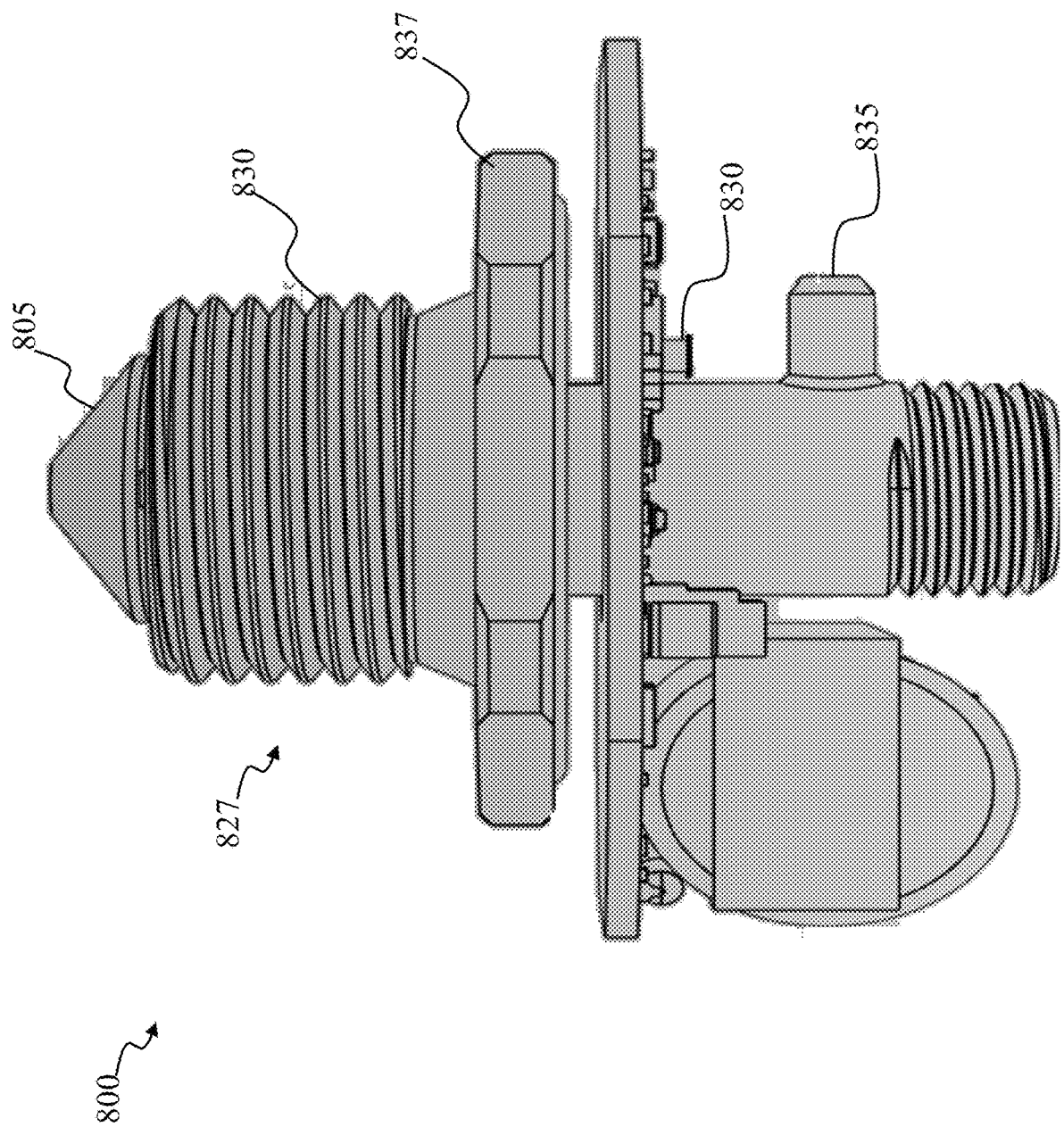
FIG. 8A illustrates a three-dimensional view of a device designed to measure the pressure of the liquid for determining the liquid level in a container by using an external pipe, according to exemplary embodiments of FIG. 3A.

Reference is made to FIG. 8A illustrating a three-dimensional view of a device designed to measure the pressure of the liquid for determining the liquid level in a container by using an external pipe, according to exemplary embodiments of FIG. 3A. FIG. 8A shows a device 800 designed to measure the pressure of the liquid for determining the liquid level in a container (not shown). Device 800 comprises a shaft 827 which is a cylinder-shaped hollow shaft connected at the upper edge thereof to a cover 805.

In some embodiments, the shaft 827 comprises screw thread 830 designed to be screwed into an opening in the container bottom, e.g., as shown in FIG. 2, thereby fasten the shaft 827 to the container bottom wall, as aforementioned.

In some embodiments, the device 800 comprises a nut-shaped member 837 adapted for screwing the device 800 with any tool used for gripping the nut-shaped member 837 and turning the device 800 clockwise or counterclockwise, e.g., a wrench.

Device 800 also comprises an output connector 835 located at the lower part of an upper chamber 820, wherein the upper chamber 820 is positioned vertically as aforementioned. The output connector 835 may also be adapted to connect a pipe thereon as described further below. In some embodiments, the output connector 835 can covey liquid, e.g., from the upper chamber 320, outward.

In some embodiments, a pipe (not shown) can be connected to the input connector 830 and convey liquid flowing from the output connector 835 to the input connector 830.

In some embodiments, the structure shown in FIG. 8A comprising the output connector 835 and the input connector 830 is adapted to remain outside the container (not shown) such that liquid flowing from the device 800, can flow out via the pipe connected between the output connector to the input connector for the purpose of exerting pressure by the weight of the liquid held in the device 800.

Reference is made to FIG. 8B illustrating a cross-section view of a device designed to measure the pressure of the liquid for determining the liquid level in a container by using an external pipe, according to exemplary embodiments of the FIG. 3A. FIG. 8B shows cross-section view of a device a device 800A designed to measure the pressure of the liquid for determining the liquid level in a container (not shown).

Device 800A comprises an output connector 835A adapted to connect a pipe 855 thereon. In some embodiments, the output connector 835A can covey liquid as shown in liquid 870, e.g., from the upper chamber 820, outward to the pipe 855.

In some embodiments, pipe 855 can be connected to the input connector 830A and convey liquid 870 flowing from the output connector 835 to the input connector 830.

In some embodiments, the liquid 870 exerts pressure by the weight of the liquid held in the device 800 to a gas bubble 860 trapped in pipe 855. In some embodiments, the gas bubble 860 is trapped inside the input connector and some space at the edge of the pipe 855 which is attached or connected to the input connector 830.

In some embodiments, the gas bubble 860 comprises air.

In some embodiments, the gas bubble 860 convey the pressure exerted thereon to a sensor (not shown) located in device 800, as aforementioned. In some embodiments, the trapped gas bubble 860 can flow into the input connecter 830A, thus convey pressure on a sensor located therein (not shown).

In some embodiments, the connection between the pipe 855 and the input connector 830A create chamber preventing from the gas bubble In some embodiments, measuring and calculating the pressure values can involve measuring the pressure exerted by the liquid 870 the gas bubble 860 which conveying the pressure to one pressure sensor (e.g., such as the first pressure sensor 355A).

In some embodiments, the atmospheric pressure measured by another pressure sensor (e.g., second pressure sensor 355B) can be reduced from the value of the pressure value received by the measurement of gas bubble 860.

Further, in some embodiments, the liquid 870 pressure value can be achieved by two different reference pressures, wherein the first pressure sensor measures the gas bubble 860 pressure value, and the second pressure sensor measures the atmosphere pressure value. In some embodiments, the method of measuring the gas bubble 860 pressure can involve reducing the atmosphere pressure value from the liquid pressure value and thereby determine the net pressure value of the liquid 870.

In some embodiments, the sensors adapted to measure pressure are operantly coupled to a circuit board (not shown) as aforementioned.

In some embodiments, the structure shown in FIG. 8B comprising the output connector 835A and the input connector 830A are adapted to remain outside the container (not shown) such that liquid flowing from the device 800A, can flow out via the pipe connected between the output connector to the input connector for the purpose of extracting pressure by the weight of the liquid held in the device 800A.

In some embodiments, pipe 855 is a bendable pipe, namely can be bent easily by a user, e.g., a person, utilizing the device 800A. In such cases, the pipe 855 can accommodate large relative motions. In some embodiments, the bendable pipe 855 can be made of PVC (Polyvinyl chloride), metal, plastic or any other material know for a person has ordinary skills in the art.

In some embodiments, the pipe 855 is adapted to coat the output connector 835A the and/or the input connector 830A such that the pipe 855 exerting the level of resistance required for preventing from the pipe 855 to slip off the connectors. In some embodiments, additional elements may be required to strengthen the pressure exerting by the pipe 855 on the output connector 835A and/or the input connector 830A. In some embodiments, such elements may be a bracket, a clamp, a screw, or any device or element adapted to the pressure of preventing the pipe 855 from slipping out and/or disconnecting.

In some embodiments, device 800A is designed to achieve the functionality gained by the lower chamber and upper chamber (e.g., lower chamber 350 and upper chamber 320). In some embodiments, the lower chamber is replaced by a structure comprising the output connector 835A the pipe 855 and the input connector 830A.

In some embodiments, the input connector 830A further contains diaphragm gasket such that liquid 870 exerts weight on the gas bubble 860 which can exert pressure on the diaphragm gasket (not shown), thereby the diaphragm gasket exerts pressure on the first pressure sensor, as aforementioned, which may be designed to measure the pressure exerted on the gas bubble 860.

Figure 8C:
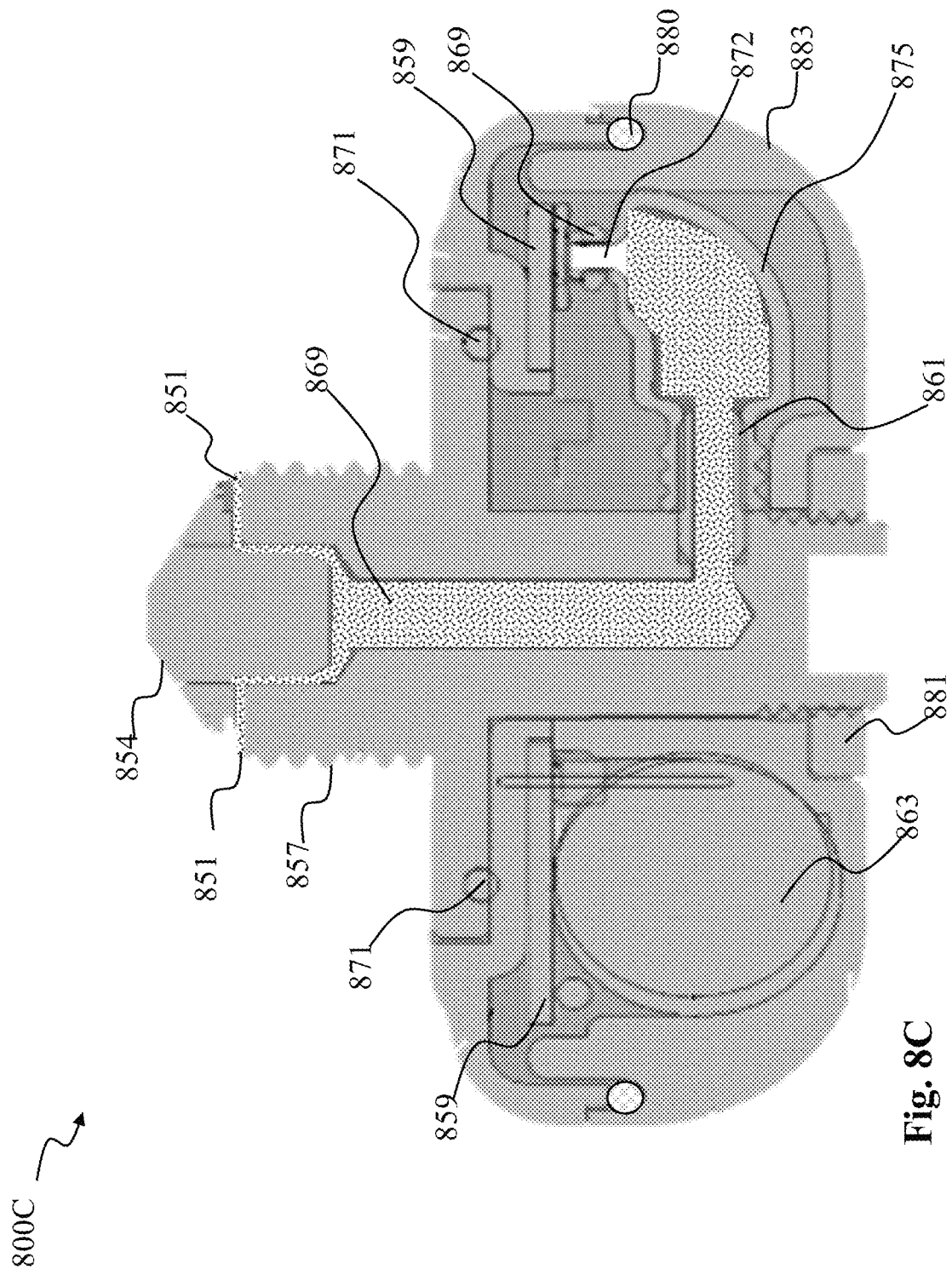
FIG. 8C shows a cross section view of a device designed to measure the pressure of the liquid for determining the liquid level in a container by using an external pipe, according to exemplary embodiments of FIG. 3A; and, FIG. 9 depicts a method to measure the pressure of the liquid for determining the liquid level in a container by using an external pipe, according to exemplary embodiments of the present disclosure.

Reference is made to FIG. 8C showing a cross section view of a device designed to measure the pressure of the liquid for determining the liquid level in a container by using an external pipe, according to exemplary embodiments of FIG. 3A.

FIG. 8C shows a device 800C designed to measure the pressure of the liquid for determining the liquid level in a container (not shown).

Device 800 comprises a shaft 857 which is a cylinder-shaped hollow shaft connected at the upper edge thereof to a cover 854.

In some embodiments, the shaft 857 comprises screw thread designed to be screwed into an opening in the container bottom, e.g., as shown in FIG. 2, thereby fasten the shaft 827 to the container bottom wall, as aforementioned.

Device 800C also comprises a first pressure sensor 869 connected to a circuit board 859. In some embodiments, the circuit board 859 can be an electrical component assembly, e.g., printed electrical board, designed to receive the electrical signals from the first pressure sensor 869.

Device 800C also comprises a battery 863. In some embodiments, the circuit board 859 comprises a standalone power source, e.g., a battery 863, required to operate the first pressure sensor 869 and the electrical components of the circuit board 859. In some embodiments, the circuit board 859 can be connected via cable to an external power source. In such embodiments, the cable can be a power cable connected to power source such as a battery, or a power grid.

Device 800C also comprises an output connector 861 located at the lower part of an upper chamber 869, wherein the upper chamber 869 is positioned vertically as aforementioned.

In some embodiments, the liquid can be entrance to the upper chamber 869 via upper slots 851. For the matter of convenience and to allow a person who has skills in the art to encompass the mechanical elements, at least some of the spaces where the liquid can reach in device 800C are shown with a dotted background.

Device 800C also comprises a ring gasket 871 designed to seal the opening in the container bottom wall and prevent leaking from that opening.

In some embodiments, the liquid the upper chamber 869 exerts pressure by the weight of the liquid held in the device 800C to a gas bubble trapped in input connector 872. In some embodiments, the gas bubble trapped in input connector 872 is trapped inside the input connector 872 and some space at the edge of the pipe 875 which is attached or connected to the input connector 872.

Device 800C also comprises a sealing element 880 designed to prevent from liquid to enter into the inner spaces of the device 800C, a closing nut 881, and a closure 883 designed to form a house to the device 800C and the elements thereof.

Figure 9:
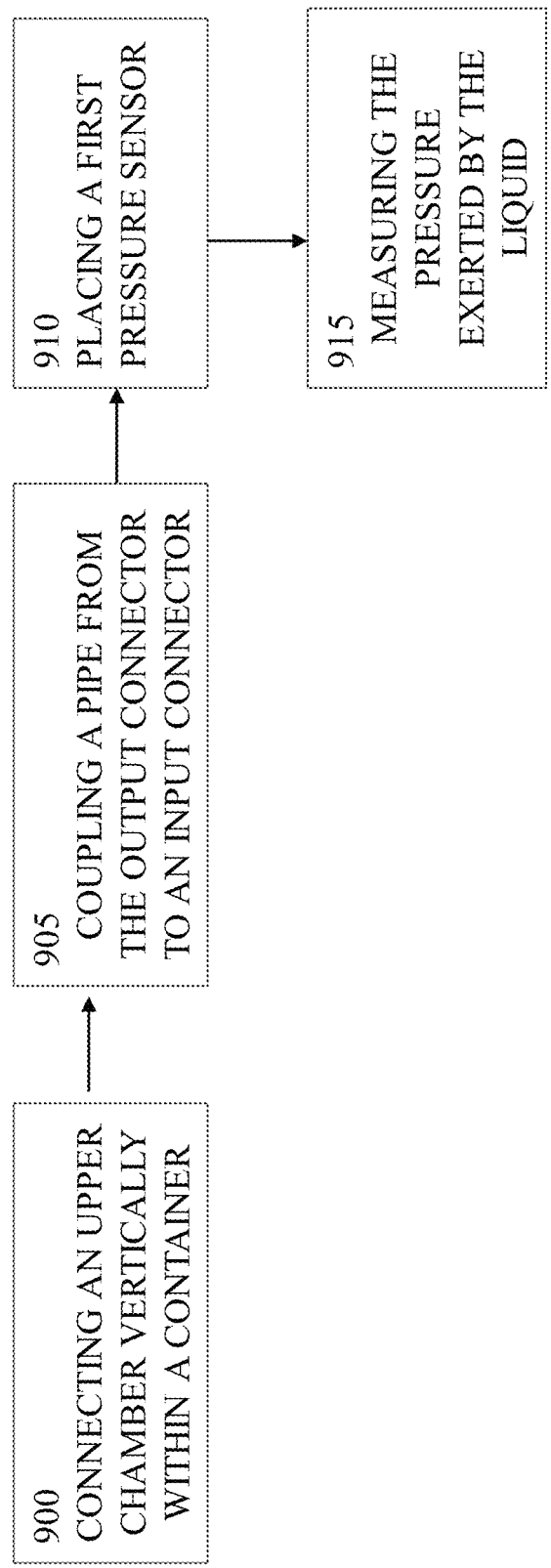

Reference is made to FIG. 9 depicting a method to measure the pressure of the liquid for determining the liquid level in a container by using an external pipe, according to exemplary embodiments of the present disclosure.

In step 900, a device, e.g., device 800 is inserted within a container designed to hold liquid. In some embodiments, such a device comprising an upper chamber as aforementioned. Thus, the chamber is positioned vertically to the ground. In some embodiments, inserting the device to the chamber is done by screwing the device to hole as aforementioned.

At step 905 a pipe is coupled from an output connector, e.g., output connector 835A, to an input connector e.g., input connector 830A. In some embodiments, the output connector is located at the lower section of the upper chamber.

In some embodiments, the output connector remains outside the container holding the liquid. In some embodiments, the lower side of the upper chamber is stretched outside of the container while the upper side of the upper chamber is located within the container. In some embodiments, the pipe connected to the output container is located outside the container.

In some embodiments, a gas bobble is located to be held within the input connector or at some dedicated space within the input connector and the pipe edge at the part of the pipe used for connecting the pipe to the input connector. Hence, the gas bubble is trapped within the pipe, at the edge of it and a space of the input connector.

At step 910 a sensor designed to measure pressure, e.g., first pressure sensor, is placed within the input connector for measuring the pressure. In some embodiments, step 910 comprises the actions require to place the sensor such that, the sensor can measure the pressure exerted by the gas bobble, wherein the purpose of the gas bubble is to measure the pressure conveyed by the liquid within the pipe.

In some embodiments, the liquid within the pipe has the same pressure of the liquid inside the container. Thus, measuring the pressure exerted by the gas bubble can be used as indicative of the liquid level changes in the container.

In some embodiments, the step above further comprising operantly coupling the first pressure connector to a circuit board, wherein said circuit board operantly coupled to a second pressure connector, e.g., 355B at FIG. 3A, configured to measure the air pressure outside of the container.

In some embodiments, the circuit board is designed to calculate a net pressure value by reducing the pressure measured by the second pressure sensor from the pressure value measured by the first pressure sensor, and wherein the net pressure value is indicative of the liquid level in the container.

What is claimed is:

1. A device, comprising:
   an upper chamber vertically connected above a lower chamber, wherein said lower chamber is adapted to be inserted into an inner side of a bottom wall of a container designed to hold a liquid, thus the upper chamber positions the lower chamber within said liquid;
   a diaphragm gasket functioning as an elastic common-wall of said two connected chambers, designed to separate said two connected chambers; a
   first pressure sensor located at the lower chamber;
   wherein
   the upper chamber comprises tiny slots designed to prevent solid particles suspended in said liquid from entering into the upper chamber, to allow the liquid in the container to enter the upper chamber and exert weight on the diaphragm gasket, thereby the diaphragm gasket exerts pressure on the lower chamber which is relatively compatible with a liquid-pressure exerted by the liquid held in said container,
   and wherein the first pressure sensor is designed to measure the pressure exerted on the lower chamber.

2. The device of claim 1, the lower chamber further contains air such that the liquid in the upper chamber exerts weight on the diaphragm gasket, thereby the diaphragm gasket exerts pressure on the lower chamber containing air exerting pressure on the first pressure sensor designed to measure the pressure exerted on the lower chamber.

3. The device of claim 1, wherein said upper chamber with the tiny slots is designed such that the pressure exerted by the liquid enters to the upper chamber is relatively compatible to the pressure exerted by the liquid held in the container, outside of the upper chamber, to enable measuring the pressure of the liquid in the upper container wherein said container is on the move.

4. The device of claim 1, is embedded in a discharge valve of said container.

5. The device of claim 1, wherein the first pressure sensor is an electronic pressure sensor operantly coupled to a circuit board, wherein the circuit board is operantly coupled to a second pressure sensor configured to measure the air pressure outside of the container.

6. The device of claim 5, wherein said circuit board is designed to calculate a net pressure value by reducing the pressure measured by the second pressure sensor from the pressure value measured by the first sensor, and wherein the net pressure value is indicative of the liquid level in the container.

7. The device of claim 1, wherein the upper chamber is jointly formed by a cylinder shaped hollow shaft and a cover, and wherein the tiny slots are positioned at the cover.

8. The device of claim 1, wherein the cover has a round-shaped cover causing the solid particles to glide around the cover and sink outside the sensor vicinity.

9. A method, comprising
   connecting an upper chamber vertically above a lower chamber, said lower chamber is adapted to be inserted into an inner side of a bottom wall of a container designed to hold a liquid;
   inserting the lower chamber to the bottom wall, thus lower chamber positions the lower chamber within said liquid;
   placing a diaphragm gasket functioning as an elastic common wall of said two connected chambers, designed to separate said two connected chambers; placing
   a first pressure sensor located at the lower chamber; wherein
   the upper chamber comprises tiny slots preventing from solid particles suspended in said liquid from entering into the upper chamber, allowing the liquid in the container to enter the upper chamber and exert weight on the diaphragm gasket, thereby the diaphragm gasket exerts pressure on the lower chamber which is relatively compatible with a liquid-pressure exerted by the liquid held in said container,
   and wherein contains the first pressure sensor is designed to measure the pressure exerted on the lower chamber.

10. The method of claim 9, the lower chamber further contains air such that the liquid in the upper chamber exerts weight on the diaphragm gasket, thereby the diaphragm gasket exerts pressure on the lower chamber containing air exerting pressure on the first pressure sensor designed to measure the pressure exerted on the lower chamber.

11. The method of claim 9, wherein the first pressure sensor is an electronic pressure sensor operantly coupled to a circuit board, wherein the circuit board is operantly coupled to a second pressure sensor configured to measure the air pressure outside of the container.

12. A device, comprising:
    an upper chamber vertically located within a container, said container is designed to hold a liquid;
    said upper chamber is connected to an output connector, wherein the output connector is coupled to a pipe connecting to an input connector;
    said input connector comprises a first pressure sensor adapted to measure pressure;
    wherein
    the upper chamber comprises liquid received from the container, wherein said upper chamber is designed to allow the liquid to flow via the output connector through the pipe thereby to exert pressure on a gas bubble trapped in a space of said input connector, wherein the pipe is connected to the input connector, such that said gas bubble exerts pressure on a first pressure sensor designed to measure the pressure conveyed from the liquid and exerted by the gas bubble.

13. The device of claim 12, wherein the output connector, the pipe and the input connector are adapted to remain outside the container.

14. The device of claim 12, wherein the first pressure sensor is designed to measure pressure values, wherein said pressure values are indicative of the liquid level changes in the container.

15. The device of claim 12, wherein the input connector comprises a gasket designed to differ between the gas bubble and the first pressure sensor.

16. The device of claim 12, wherein the first pressure connector is operantly coupled to a circuit board, said circuit board operantly coupled to a second pressure connector configured to measure the air pressure outside of the container, such that the circuit board is designed to calculate a net pressure value by reducing the pressure measured by the second pressure sensor from the pressure value measured by the first pressure sensor, and wherein the net pressure value is indicative of the liquid level in the container.

17. A method, comprising
   connecting an upper chamber vertically within a container, said container is designed to hold a liquid;
   placing an output connector from a lower side of the upper chamber, and coupling a pipe from the output connector to an input connector;
   placing a first pressure sensor located at the input connector;
   wherein,
   said liquid flows via the output connector through the pipe thus exerts pressure on a gas bubble trapped in a space of said input connector and the pipe at an edge of the pipe connected to the input connector, and wherein said gas bubble exerts pressure on a first pressure sensor for measuring the pressure conveyed from the liquid and exerted by the gas bubble.

18. The method of claim 17, wherein the output connector, the pipe and the input connector are placed outside the container.

19. The method of claim 17, wherein a gasket is used to differ between the gas bobble and the first pressure sensor.

20. The method of claim 17 further comprises operantly coupling the first pressure connector to a circuit board, wherein said circuit board operantly coupled to a second pressure connector configured to measure the air pressure outside of the container, such that the circuit board is designed to calculate a net pressure value by reducing the pressure measured by the second pressure sensor from the pressure value measured by the first pressure sensor, and wherein the net pressure value is indicative of the liquid level in the container.

* * * * *